United States Patent [19]

Dietrich

[11] Patent Number: 4,943,356
[45] Date of Patent: Jul. 24, 1990

[54] METHOD AND APPARATUS FOR CLEANING SULPHUR AND NITROGEN CONTAINING FLUE GASES BY REACTION UNDER THE ACTION OF ELECTRON BEAMS

[75] Inventor: Walter Dietrich, Hanau am Main, Fed. Rep. of Germany

[73] Assignee: Leybold Aktiengesellschaft, Hanau I, Fed. Rep. of Germany

[21] Appl. No.: 379,484

[22] Filed: Jul. 13, 1989

Related U.S. Application Data

[63] Continuation of Ser. No. 818,777, Jan. 14, 1986, abandoned.

[30] Foreign Application Priority Data

Jan. 16, 1985 [DE] Fed. Rep. of Germany ....... 3501158

[51] Int. Cl.$^5$ .............................................. B01J 19/08
[52] U.S. Cl. ........................ 204/157.3; 204/157.44; 422/186
[58] Field of Search .................. 204/157.3, 157.44; 422/186, 186.01, 186.02, 186.03

[56] References Cited

U.S. PATENT DOCUMENTS

| 2,786,156 | 3/1957 | Lorenz | 313/7 |
| 4,507,265 | 3/1985 | Higo et al. | 422/186 |
| 4,595,569 | 6/1986 | Reuter et al. | 422/186 |

Primary Examiner—Nam X. Nguyen
Attorney, Agent, or Firm—Felfe & Lynch

[57] ABSTRACT

Method and apparatus for cleaning sulphur and nitrogen containing flue gases by supplying a gaseous reagent such as ammonia gas. The reaction mixture is converted in a reaction chamber through which the reactants flow at a pressure of between 1 and 5 bar under the action of electron beams. The electron beams are injected into the reaction chamber from the vacuum required at the beam source through at least one pressure step stage surrounding the beam path.

18 Claims, 5 Drawing Sheets

METHOD AND APPARATUS FOR CLEANING SULPHUR AND NITROGEN CONTAINING FLUE GASES BY REACTION UNDER THE ACTION OF ELECTRON BEAMS

This application is a continuation of U.S. Ser. No. 818,777 filed Jan. 14, 1986, now abandoned.

BACKGROUND TO THE INVENTION

The invention relates to a method of cleaning sulphur and nitrogen containing flue gases by supplying gaseous reagent, preferably ammonia gas and converting the fumes with the reagent in a reaction chamber through which the reactants flow at a pressure of between 1 and 5 bar under the action of electron beams.

The method is principally provided for use in large boiler plants in order to minimize the emission of hazardous acid components of sulphur ($SO_x$) and nitrogen ($NO_x$) and thus to meet environmental requirements.

From a publication by the firm Ebara/Japan "Electron Beam Flue Gas Cleanup Process" a method is already known in which an approximately stoichiometric proportion of ammonia gas ($NH_3$) is added to flue gas before the mixture is subjected to the action of electron beams. By this means the harmful components of the flue gas are converted to ammonium sulphate or ammonium nitrate, both of which serve as fertilizers.

A problem with the process described in this publication lies n introducing the electron beams into the reaction chamber. The sources of electron beams, in general electron emitting cathodes heated to a high temperature, can only operate in a high vacuum. The contents of the reaction chamber, however, are at atmospheric pressure or higher. Electron beams have the property of spreading in a gaseous atmosphere from collisions with the gas molecules, so that their range is markedly reduced after they emerge from the vacuum into atmospheric pressure. This is one reason why many electron beam treatment methods are carried out under high vacuum. A further problem encountered in the prior art involves creating the most homogeneous interaction between the reaction mixture on the one hand and the electron beams on the other.

In known methods electron beams are produced with an accelerating potential of 300 KV and injected into the reaction chamber through a "window" made out of a thin metal foil such as titanium/palladium. The window-foil acts as a separator wall between the high vacuum electron beam source and the atmosphere in the reaction chamber, but when sufficiently thin it is at least partially penetrable to the electron beams. The window-foil is not damaged by the high energy density of the electron beam by virtue of the latter being deflected periodically over the window surface by a deflection system associated with the beam source.

However, this prior art method and the apparatus required for it exhibit numerous disadvantages: the high acceleration potential of 300 KV required for penetrating the film window requires an expensively constructed electron gun. Also, the high accelerating potential is accompanied by a correspondingly strong X-radiation at the emission point, so that comprehensive radiation shielding is necessary. Moreover, the foil-windows result in a high loss of efficiency which with the necessary high electrical power leads to correspondingly high energy losses and also to an extraordinarily high thermal strain on the window. As a result of these factors, as well as through the interaction of the foil window with the reaction chamber contents, it is necessary to replace the window frequently, with a resulting relatively high proportion of downtime for the whole cleaning plant. This means that for continuous use of the boiler plant a number of cleaning plants must always be provided to run in parallel.

The present invention is thus in part directed to providing a process for cleaning flue gases through the reaction of the gases with ammonia gas under the action of electron beams, but with a higher operational safety level, a lower radiation level, and a higher efficiency than is found in the prior art.

SUMMARY

According to the present invention electron beams are injected into a reaction chamber from the vacuum required at the beam source through at least one pressure step stage surrounding the beam path Electron beam sources are known. See, for example, U.S. Pat. No. 3,478,244. Some such sources having a pressure step stage are also known, but they have not hitherto been used for flue gas cleaning. Rather their uses have been limited to processes such as channeling out a focused electron beam to the atmosphere in order to carry out electron beam welding on large workpieces.

The method according to the present invention first makes possible a simpler construction of apparatus by using an electron beam source with lower accelerating potential, lying between about 100 and 200 KV, and thus has a substantially lower production of X-radiation. This results in a reduced requirement for radiation shielding. At the same time, a simpler construction of electron gun can be used, since the necessary insulation gaps can be substantially smaller than is the case for guns employing a higher accelerating potential.

A pressure step stage, which comprises a series of apertured diaphragms through which the electron beam can pass unimpeded, has practically no power loss. This means that almost 100% of the electron beam power is available in the reaction chamber for carrying out the chemical reaction. Also, heat loss arising at the foil window is avoided. Pressure step stages do not employ sealed components and require cleaning at substantially less frequent time intervals than do foil windows, so that the down time of the cleaning apparatus is substantially reduced.

It is possible to eliminate downtime completely when a larger number of electron beam sources are provided. The entry aperture into the reaction chamber for a focused electron beam is very small, with a diameter of a few millimeters, as opposed to the area of a foil window which amounts to several square decimeters. Thus, it is possible to close the entry aperture into the reaction chamber by a closure device so that the electron beam source can be serviced while its function is taken over by another electron beam source.

By the channelling of a definitely focused electron beam at the entry point into the reaction chamber, the beam can be deflected into defined paths inside the reaction chamber by deflection devices which will be further explained below, so that a specifically controllable interaction of the electron beam or beams with the reaction mixture is possible.

It is particularly advantageous for the reaction to be carried out in a reaction chamber with a circular cross-section and to have electron beams from a plurality of beam sources injected substantially parallel, each to a tangent to the circular cross-section, but displaced from the center of the circular cross-section. In this way a plurality of diffused electron beam packets follow each other in the peripheral direction of the circular cross-section, and the course of their paths can be so influenced that practically the whole cross-section of the reaction chamber is permeated by electron beams. Most preferably the electron beams should be guided in substantially azimuthal paths through the circular cross-section.

The interaction between the reaction mixture and the electron beams can be still further improved by forcing the flue gas into a twisting path, either by stationary guide vanes or by a driven swirl device such as an impeller.

The invention also relates to an apparatus for carrying out the method above described, having a reaction chamber and a plurality of electron beam sources.

This apparatus of the invention is characterized in that (a) the reaction chamber has a circular cross-section; and (b) the electron beam sources each have a pressure step stage surrounding the beam path through which the electron beam can be injected into the reaction chamber unimpeded by a solid barrier.

In one embodiment of the invention, the apparatus is characterized in that the electron beam sources are arranged with equi-distant distribution in at least one plane around the reaction chamber and the beam path in the region where the electron beam emerges from the pressure step stage is substantially parallel to a tangent to the circular cross-section, but distant from the center thereof.

This is particularly advantageous if, in the plane or planes a deflection device for the electron beams is arranged on the inner face of the reaction chamber, by which the electron beams are guidable into circular or spiral paths about the center of the circular cross-section of the reaction chamber.

The deflection device may comprise a rotationally symmetrical magnet system, by which magnetic field lines can be produced which pass substantially perpendicularly through at least one plane in which the paths of the electron beam run.

Such a magnetic field has the known effect that electron beams are deflected within a plane which runs perpendicular to the electron beams. By suitable structuring of the magnetic field, including if desired a defined spatial course of the magnetic field strength, the beam can be forced to follow practically any desired path within the plane. Furthermore by changing the magnetic field over time, if desired by periodic oscillation of the exciting current of electromagnets, variable paths are produced.

According to a further aspect of the invention it is particularly advantageous if the reaction chamber has a cylindrical outer wall and a coaxial insert, by which an annular flow cross-section is formed, and if the electron beam sources are arranged in the region of the insert.

In this way a hollow cylindrical reaction space is produced which can be penetrated by electron beams in particularly intensive manner, so that it is possible to have a practically total conversion of reactants.

In that coaxial arrangement, the insert can be provided with a further magnetic deflection device, of which the field lines run mirror-image fashion to the those of the deflection devices of the reaction chamber itself, considered in regard to an axial section plane.

BRIEF DESCRIPTION OF THE DRAWINGS

These show.

DETAILED DESCRIPTION OF THE PREFERRED EMBODIMENTS

Figure 1:
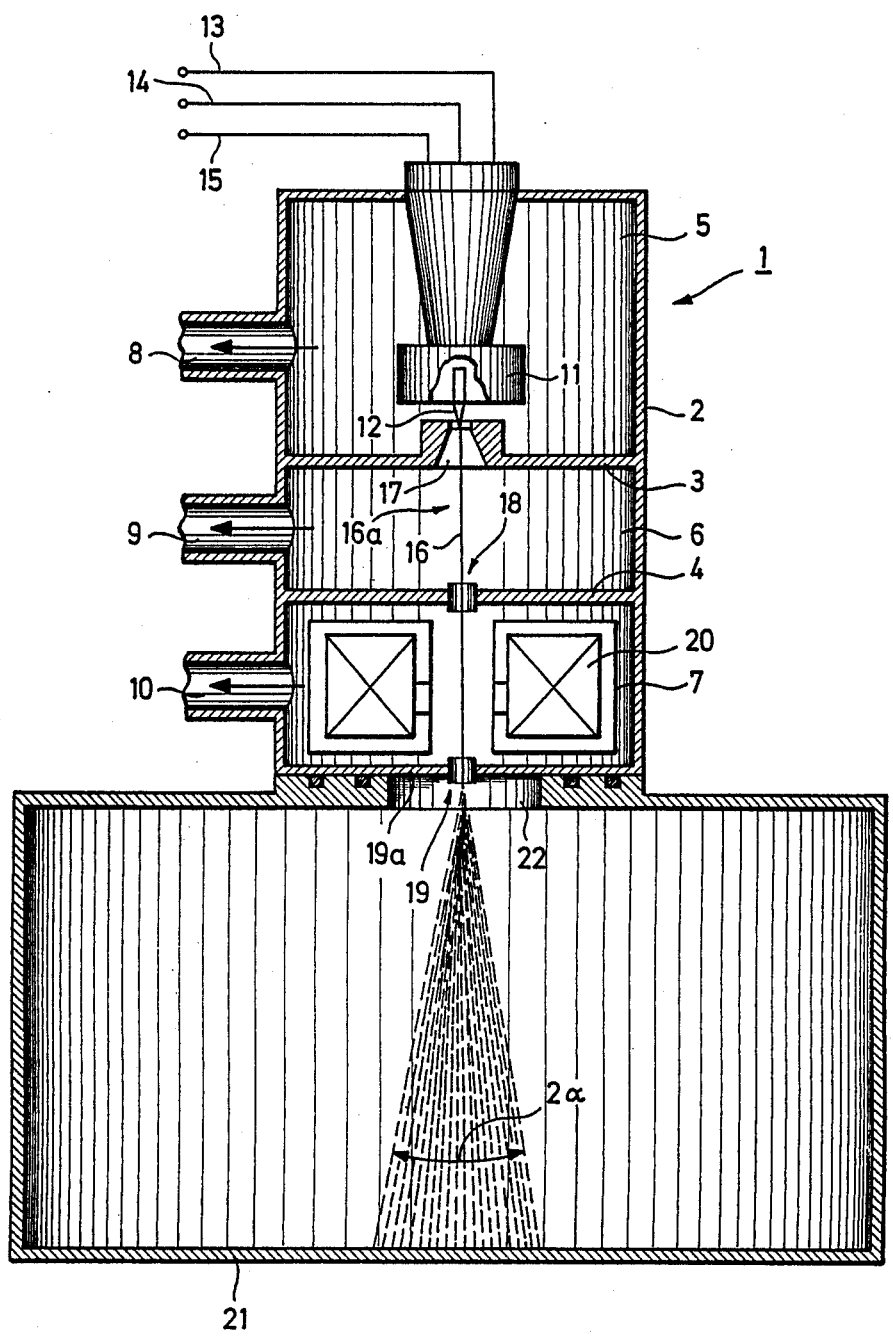
FIG. 1 an axial section through an electron beam source with pressure step stage in combination with a reaction chamber, FIG. 2 an axial section on the line II—II of FIG. 3 through a reaction chamber with a plurality of approximately tangentially arranged electron beam sources, FIG. 3 a radial section through the subject of FIG. 2 in the plane E—E (injection plane), FIG. 4 a first embodiment of a magnetic deflection device, FIG. 5 a second embodiment of a magnetic deflection device being a section on the line V—V of FIG. 6, FIG. 6 a plan view of the subject of FIG. 5, FIG. 7 a variant of the subject of FIG. 2 with an insert and also two magnetic deflection devices, FIG. 8 a section on the radial plane E—E through the subject of FIG. 7 (the injection plane), and FIG. 9 a detail from FIG. 3 with an electron beam source set in at a defined angle to the tangent T.

FIG. 1 illustrates an electron beam source 1 of conventional construction, which has a housing 2 which is divided into three chambers 5, 6 and 7 by partitions 3 and 4. The chambers are exhausted through suction leads 8, 9, and 10 and evacuable if desired to different pressures, the lowest pressure being produced in general in the chamber 5.

In the chamber 5 is arranged a directly heated cathode 12 (Wehnelt-cylinder) inside a beam forming electrode 11. High tension and heating current are supplied to the electrode system through leads 13 14 and 15.

The cathode 12 produces an electron beam 16 which runs in a rectilinear beam path 16a. At the places where the beam passes through, narrow apertures 17 and 18 are arranged within the housing 2 and the partitions 3 and 4, which partitions have the effect of diaphragms. At the lower end of the electron beam 1 there is a further similar aperture 19 in an end wall 19a. The apertures form together with the chambers 5, 6 and 7 a so-called pressure step stage which maintains the vacuum in the chamber 5 with respect to atmosphere, and in the apertures there is no solid matter partition. The partition 3 has in addition the function of an accelerating anode. In the chamber 7 is arranged focussing lens 20 by which the electron beam is first narrowed down.

The electron beam 16 emerges from the aperture 19 and has for the above explained reasons the tendency to spread out to form a profile, the half spreading angle being indicated with "$\alpha$", the full angle being "$2\alpha$". The order of magnitude of the full spreading angle is about 10 to 20 degrees, if the electron beam is in an atmosphere at a pressure between about 1 bar and 5 bar.

The gaseous atmosphere is in a reaction chamber 21, illustrated schematically, which is flanged to the electron beam source 1 by an unclosed opening 22. The necessary gas leads for the reactants and also for the removal of the reaction products are conventional and are not shown. Experience shows that with acceleration potential on the cathode 12 between about 100 and 200 KV the extent to which the electron beam 16 penetrates in the reaction chamber 21 amounts to about 50 cm to 1 m according to acceleration potential and beam current.

Figure 2:
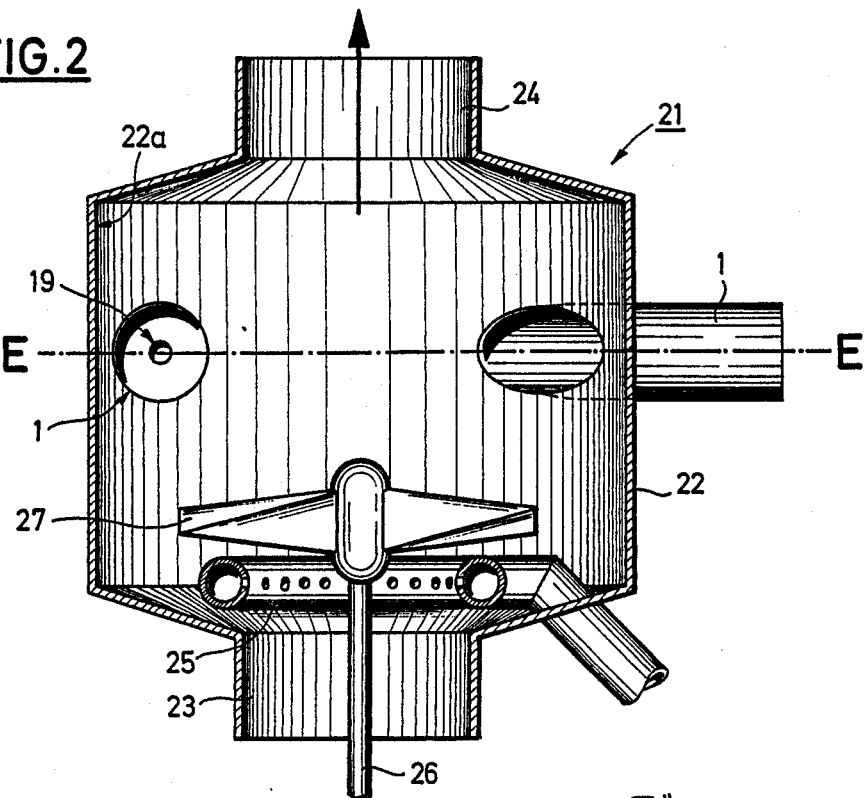
Figure 3:
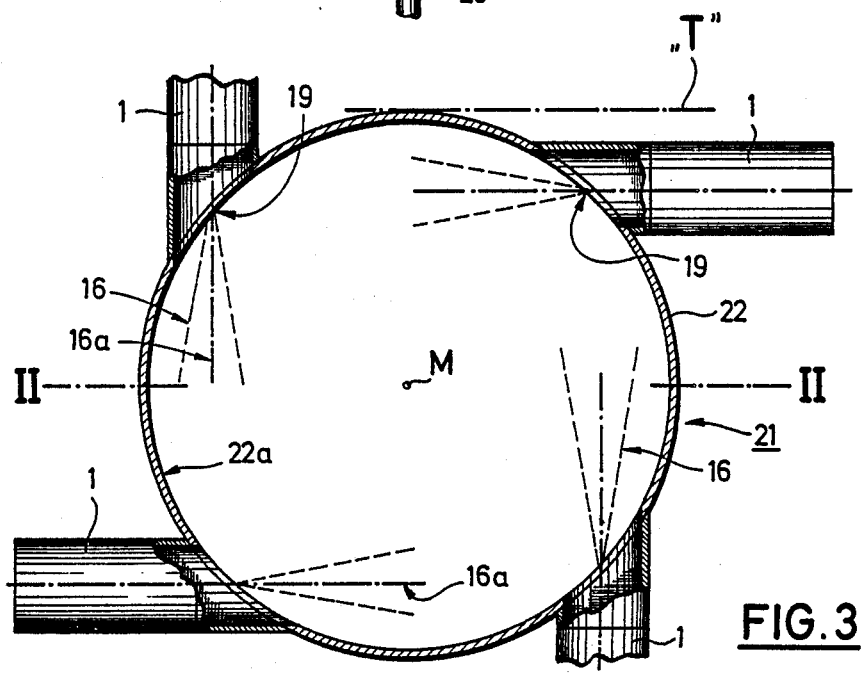

In FIGS. 2 and 3 is shown a reaction chamber 21 having a circular cross-section; i.e. the reaction chamber 21 has over at least a part of its length a cylindrical outer wall 22. The reaction chamber 21 is provided with an input connector 23 for the flue gas and an output connector 24 for the products. Directly above is the input connector 25 for the gaseous reagent (ammonia), but the reagent can be supplied also at a position further upstream and through a differently constructed distributor arrangement. In order to achieve the most homogeneous possible distribution of the reactants, a driven swirl device 27 is arranged on a shaft 26 in the flow path, which forces an additional twisting flow on the reaction mixture. The reaction mixture then enters a plane E—E radial to the vertical lengthwise axis of the reaction chamber, which is subsequently referred to as the "injection plane" for the electron beams.

As is shown in FIG. 3, there are in total four electron beam sources 1 arranged in equidistant distribution about the reaction chamber 21 in the injection plane E—E. The beam paths 16a, here indicated by dot-dash lines, run in the region where the electron beam 16 emerges from the pressure step stage, i.e. from the aperture 19 substantially parallel each to a tangent T of which one is shown in FIG. 3. The beam paths 16 do not in any event run through the center M of the circular cross-section, but are displaced to the side in the direction towards the inner face 22a of the cylindrical outer wall 22. Because of the already described spreading of the electron beams, of which the angle of divergence is indicated by dot-dash lines, there results in the peripheral direction and in anti-clockwise direction a substantially closed path field of electron beams, which is produced without the assistance of deflection devices roughly in the direction of the dot-dash lines for the angle of divergence. By the use of deflection devices, to be described further below, the electron beams are prevented from impinging upon the outer wall 22 and thus undesirable heating is prevented.

It is not necessary to arrange all the electron beam sources in a single injection plane E—E, as shown in FIG. 2, but rather a plurality of systems of electron beam sources can be arranged in several plans but then the number of deflection devices must also be correspondingly increased. The number of planes E—E depends on the flue gas and on the required degree of cleaning of the exhaust gases going into the atmosphere.

The output connector 24 leads to a precipitator—not shown—in which the powder form reaction products, for example ammonium sulphate and ammonium nitrate, are precipitated.

Figure 4:
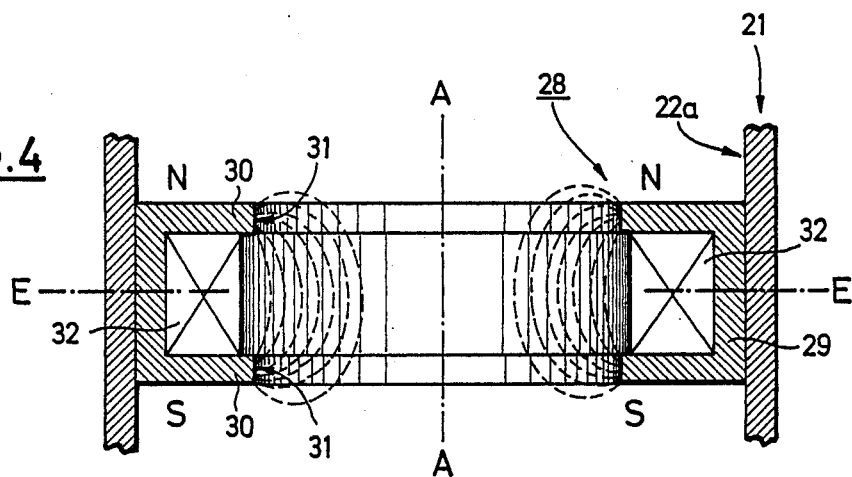

FIG. 4 shows a first embodiment of a magnetic deflection device 28 which is arranged in the injection plane E—E on the inner face 22a of the reaction chamber 21. The deflection device 28 comprises a substantially annular closed magnet yoke 29 which ends in radially inwardly directed pole shoes 30 with suitable pole faces 31. Between the pole shoes 30 is a cylindrical exciting coil 32 for the production of a magnetic flux in the magnet yoke 29 which is comprised of ferromagnetic material. This system produces a magnet system with an annular closed north pole N and an axially displaced, likewise annular closed south pole S. The major part of the magnetic force lines resulting therefrom is shown in dashed lines.

Figure 5:
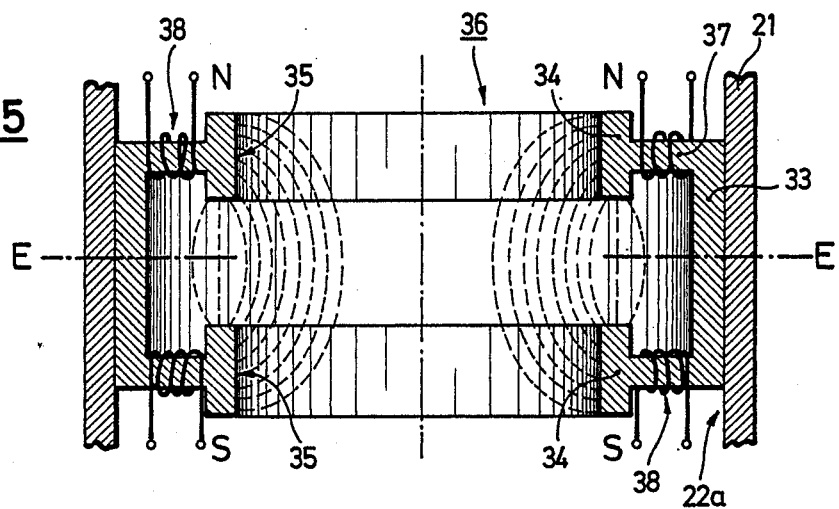
Figure 6:
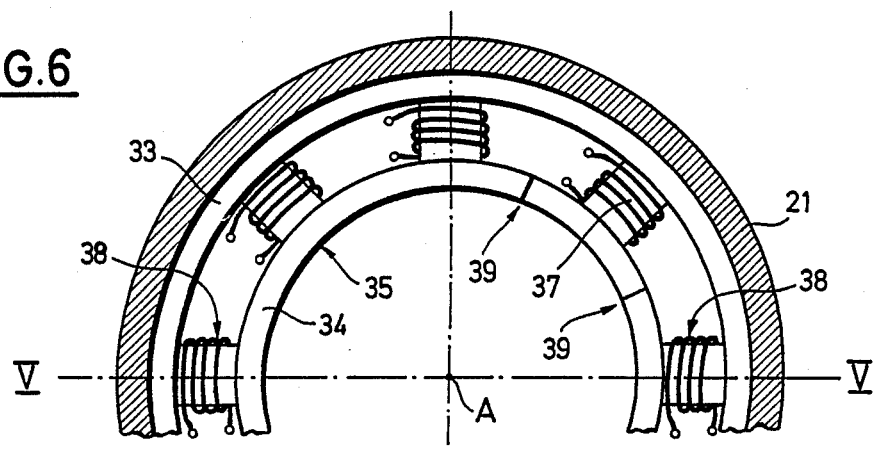

FIGS. 5 and 6 show a second embodiment of a magnetic deflection device. This too has an annular closed magnet yoke 33, but the pole shoes 34 are connected by individual bridge members 37 spaced equidistantly around the periphery and made of ferromagnetic material. The bridge members 37 are arranged one behind another in two further planes and each has its own exciting coil 38 which is connectable to an individual current supply. The pole shoes 34 can be formed from a completely peripheral annulus, as illustrated in the left half of FIG. 6. The pole shoes 34 can also be separated around the periphery by partitions or air spaces 39, as shown in the right hand half of FIG. 6. Through these measures as well as by different exciting currents in the individual exciting coils 38, different magnetic fields can be produced, so that the above described course of the electron beam paths can be specifically spatially influenced. Here too, the substantial part of the magnetic field lines is shown in dashed lines.

In the two illustrated cases, the deflection device 28 or 36 comprises a rotationally symmetric magnet system, in which the magnetic field lines pass substantially perpendicularly through the injection planes E—E, in which the paths of the electron beams run. As appears furthermore from FIGS. 4 and 5, the deflection devices 28 and 36 have annular pole faces 31 and 35 which are spaced from each other axially of the reaction chamber. A magnetic field is thereby produced between the pole faces which form an annular closed section of at least one toroidal surface.

Figure 7:
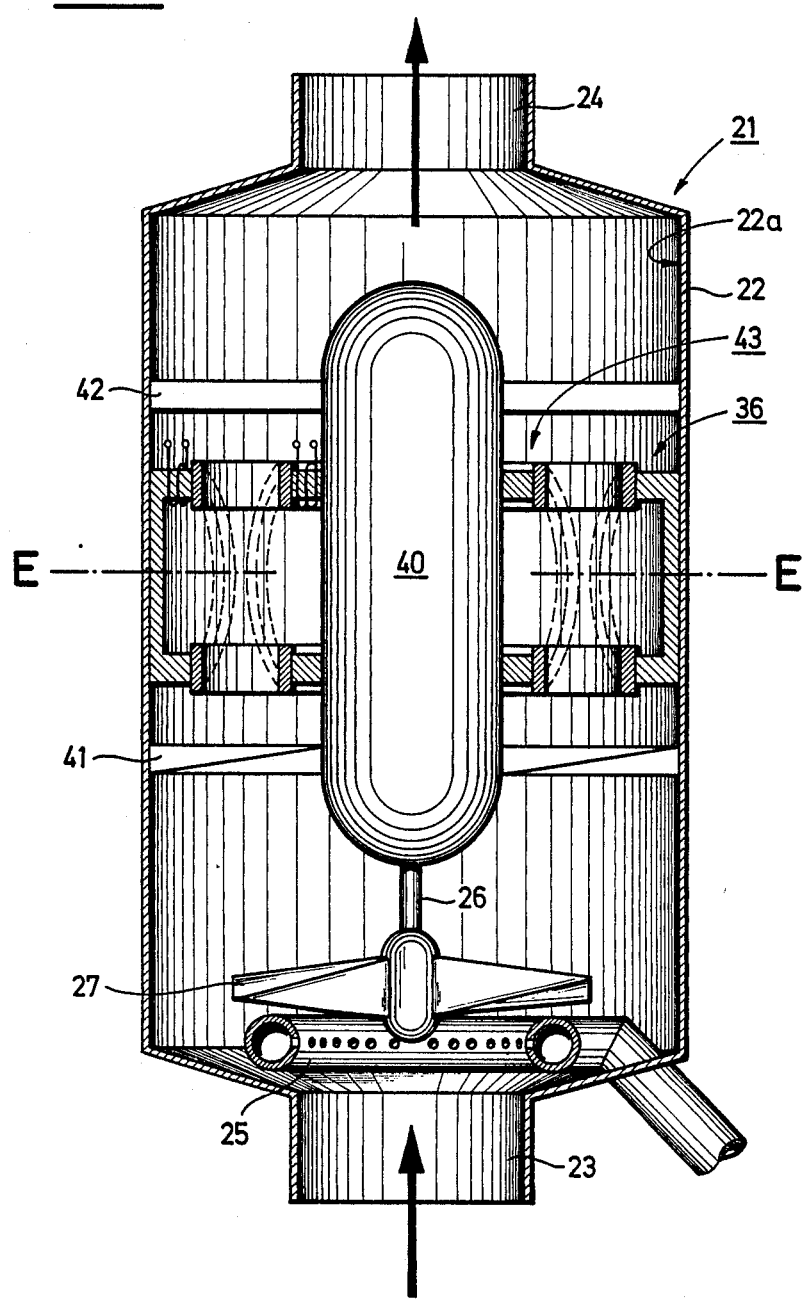

In the embodiment according to FIG. 7, the reaction chamber 21 has a greater axial length and a torpedo shaped insert 40 is introduced into it. This forms an annular flow cross section and the electron beam sources 1 not shown in FIG. 7) are arranged in the region of the insert 40. There is shown only one injection plane E—E, which forms the plane of symmetry for the magnetic deflection device 36, which corresponds to that of FIGS. 5 and 6. The walls of the reaction chamber and insert can, if they comprise ferromagnetic material, be involved in the conduction of the magnetic flux of the deflection system.

The insert 40 is fixed in the cylindrical outer wall 22 by radial struts, of which the upstream struts 41 are formed as guide vanes for the production of a twisting flow. The twisting flow can also be produced by the driven swirl device 27, which leads to an improvement in the interaction with the electron beams. The drive motor for the swirl device 27 is incorporated inside the insert 40.

On the insert 40 is fixed a further magnetic deflection device, of which the magnetic field lines run mirror image fashion to the opposed field lines of the deflection device 36 fixed to the inner wall 22a. Mirror image symmetry applies in regard to an axial section plane, both to right and left of the insert 40.

Figures 8, 9:
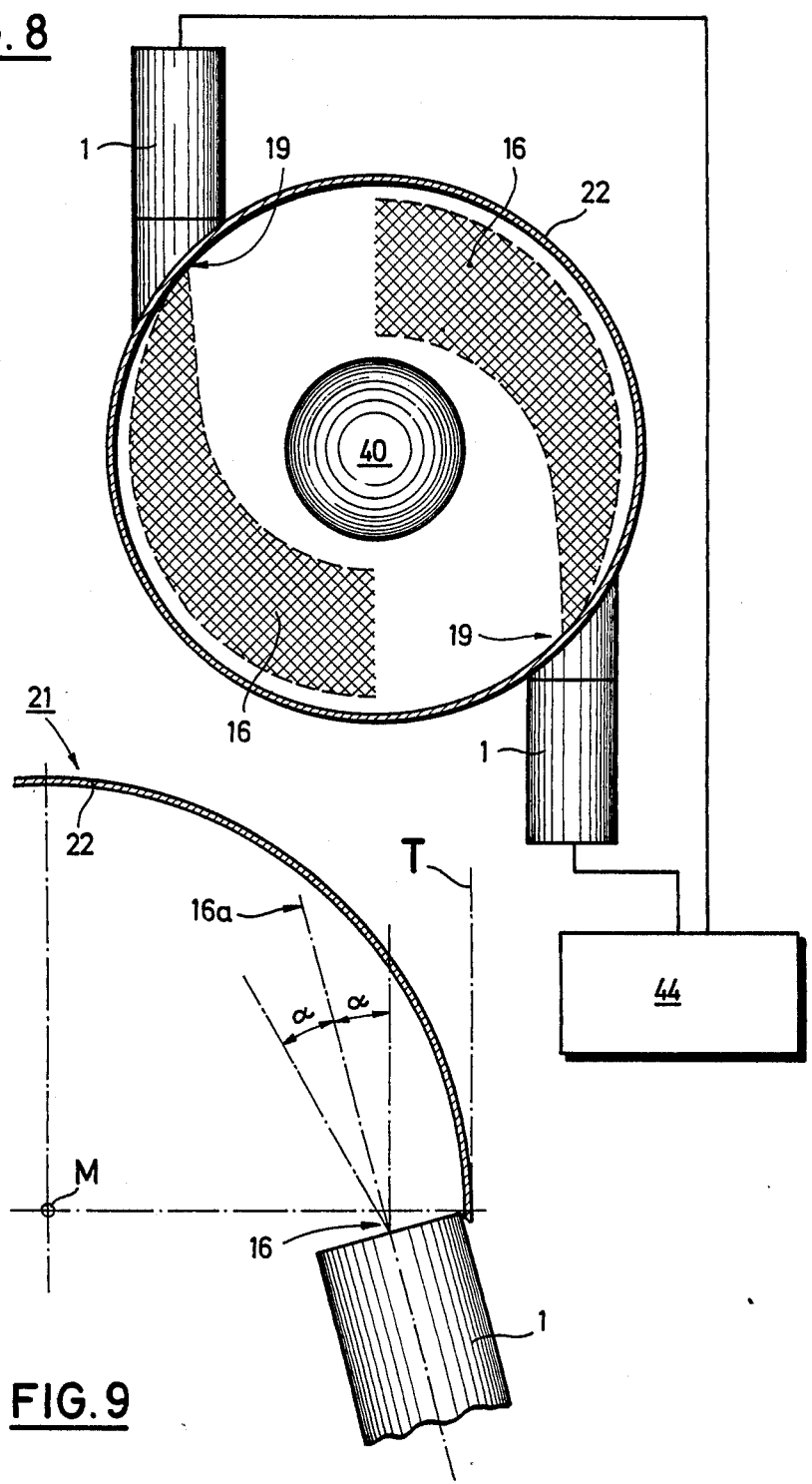

FIG. 8 shows the influence of the magnetic deflection device according to FIGS. 4 to 6 on the spatial course of the electron beam paths in the injection plane E—E. It is notable that a proportion of the electron beams travel on circular paths, another proportion in spiral paths, neither the cylindrical outer wall 22 nor the insert 40 being impinged by the electrons. As shown in FIG. 8 the circular cross-section between the outerwall 22 and the insert 40 is substantially filled with the electron beam paths. The arrangement of FIG. 8 is provided with only two electron beam sources 1. If however the arrangement would be augmented by two further electron beam sources, displaced by 90 degrees, which could be arranged in the same or in a further injection plane E—E, the reaction mixture would be penetrated unavoidably by the electron paths, so that there would be an intensive effect of the electrons on the reaction mixture. The number of injection planes E—E can be repeated several times according to the required cleaning effect.

FIG. 8 also depicts that the electron beam sources 1 are connected in customary fashion with a current supply device 44.

It is not necessary to use electro-magnetic deflection devices according to FIGS. 4 to 6, but rather electrostatic deflection devices can be used which then serve as reflectors if they are given a sufficiently high negative potential. On account of the associated electrical insulation requirements, however, it is preferred to have magnetic deflection devices.

FIG. 9 shows a further alternative arrangement of an electron beam source 1 at a tangent T to the circular cross-section of the reaction chamber 21. As is seen, the beam path 16a is inclined inwardly with respect to the tangent T by the half angle of divergence "α" of the electron beam in the region here the electron beam 16 merges from the pressure step stage. This results in the electron beam being directed already at the beginning of its path away from the cylindrical outer wall 22.

I claim:

1. Method for cleaning flue gases containing sulfur and nitrogen, comprising the following steps:
   adding a gaseous reagent to the flue gases to form a mixture,
   flowing the mixture at a pressure of between 1 and 5 bar through a reaction chamber having a cylindrical outer wall defining a substantially circular cross-section,
   injecting a plurality of electron beams into the reaction chamber from beam sources having respective pressure step stages wherein the electron beams are unimpeded by solid matter, each said beam being injected along a path substantially parallel to a respective tangent to the circular cross-section and closer to said tangent than to the center of the circular cross-section, each said beam diverging in said reaction chamber to form a profile.

2. Method as in claim 1 wherein said electron beams are deflection toward the center of the circular cross-section from the respective tangents after they are injected, whereby the beams for circular or spiral paths about the center.

3. Method as in claim 1 wherein said mixture is forced into a twisting flow in said reaction chamber.

4. Method as in claim 1 wherein said gaseous reagent is ammonia.

5. Method as in claim 1 wherein said electron beams are injected in a plurality of planes.

6. Apparatus for cleaning flue gases containing sulfur and nitrogen, comprising
   means for adding a reagent to said flue gases to form a mixture,
   a reaction chamber of substantially circular cross-section through which said mixture is flowed,
   a plurality of electron beam sources arranged about the reaction chamber, each beam source comprising a pressure step stage through which the beam is injected into the reaction chamber unimpeded by solid matter, each said beam source being arranged to inject the respective beam substantially parallel to a respective tangent to the circular cross-section and closer to said tangent than to the center of the circular cross-section.

7. Apparatus as in claim 6 wherein said sources are arranged about said reaction chamber with equidistant angular spacing.

8. Apparatus as in claim 6 wherein said electron beam sources are arranged to inject said beams in a plurality of planes.

9. Apparatus as in claim 6 further comprising deflection means which deflect the beams toward the center of the circular cross-section after they are injected, whereby said beams are guided in circular or spiral paths about the center.

10. Apparatus as in claim 9 wherein the deflection means is designed so that the profile of the electron beam is adjustable along its path.

11. Apparatus as in claim 9 wherein said deflection means comprises a rotationally symmetric magnet system which produces field lines which pass substantially perpendicularly through the planes of the electron beams.

12. Apparatus as in claim 9 wherein said deflection means has annular pole faces which are so spaced from each other in the axial direction of the reaction chamber that a magnetic field can be produced that forms an annular closed section of a toroidal surface.

13. Apparatus as in claim 12 wherein the magnetic field has a strength in the direction of the paths of the electron beams which is adjustable.

14. Apparatus as in claim 6 further comprising means for imparting a twisting flow to said mixture in said reaction chamber.

15. Apparatus as in claim 14 wherein said means for imparting a twisting flow comprises a motor driven swirl device.

16. Apparatus as in claim 6 further comprising a coaxial insert of circular cross-section within said reaction chamber in the region of said electron beam sources whereby, said electron beams are effective in an annular flow cross-section.

17. Apparatus as in claim 16 wherein said insert is supported by radial struts formed as guide vanes to produce a twisting flow.

18. Apparatus as in claim 17 further comprising a coaxial insert of circular cross-section within said reaction chamber in the region of said electron beam sources, said magnetic deflection means comprising a first magnetic deflection fixed to the wall of the reaction chamber and a second magnetic deflection device fixed to the insert, said first and second devices being arranged so that the magnetic field lines of each device are mirror symmetric to the lines of the other device when viewed in an axial sectional plane.

* * * * *

UNITED STATES PATENT AND TRADEMARK OFFICE
CERTIFICATE OF CORRECTION

PATENT NO. : 4,943,356
DATED : July 24, 1990
INVENTOR(S) : Walter Dietrich It is certified that error appears in the above-identified patent and that said Letters Patent is hereby corrected as shown below:

Column 1, line 30, delete "n" and insert -- in --.

Column 5, line 46, delete "plans" and insert -- planes --.

Column 7, line 49, delete "deflection" and insert -- deflected --.

Signed and Sealed this

Twenty-fifth Day of August, 1992

Attest:

DOUGLAS B. COMER

*Attesting Officer*   *Acting Commissioner of Patents and Trademarks*